United States Patent
Krude

Patent Number: 5,167,584
Date of Patent: Dec. 1, 1992

[54] CONSTANT VELOCITY UNIVERSAL JOINT AND A METHOD FOR MAKING SAME

[75] Inventor: Werner Krude, Neunkirchen-Seel, Fed. Rep. of Germany

[73] Assignee: GKN Automotive, Inc., Auburn Hills, Mich.

[21] Appl. No.: 658,988

[22] Filed: Feb. 21, 1991

[51] Int. Cl.$^5$ .............................................. F16D 3/24
[52] U.S. Cl. ..................... 464/145; 464/906
[58] Field of Search ............... 464/145, 906, 142, 143, 464/144, 146

[56] References Cited

U.S. PATENT DOCUMENTS

| | | | |
|---|---|---|---|
| 1,665,280 | 4/1928 | Rzeppa | 464/145 |
| 1,916,442 | 7/1933 | Rzeppa | 464/145 |
| 2,844,013 | 7/1958 | Spence | 464/145 |
| 2,987,897 | 6/1961 | Spence | 464/145 |
| 3,324,682 | 6/1967 | Bendler | 464/145 |
| 3,412,580 | 11/1968 | Cull | 464/145 |
| 3,935,717 | 2/1976 | Welschof | 464/145 |
| 3,982,840 | 9/1976 | Grosseau | 464/145 X |
| 4,083,201 | 4/1978 | Krude et al. | 464/145 |
| 4,156,353 | 5/1979 | Welschof | 464/145 |
| 4,185,476 | 1/1980 | Krude | 464/146 X |
| 4,275,571 | 6/1981 | Welschof | 464/145 |
| 4,319,465 | 3/1982 | Ito et al. | 464/145 |
| 4,455,734 | 6/1984 | Yoshioka et al. | 464/906 X |
| 4,610,643 | 9/1986 | Krude | 464/143 |

FOREIGN PATENT DOCUMENTS 2606752 8/1976 Fed. Rep. of Germany ...... 464/145

*Primary Examiner*—Daniel P. Stodola
*Assistant Examiner*—Tony A. Gayoso
*Attorney, Agent, or Firm*—Harness, Dickey & Pierce

[57] ABSTRACT

A constant velocity universal joint and a method for assembly thereof. The constant velocity universal joint has an inner race having a plurality of ball tracks. At least one ball track has an edge chamfered to provide a second diametral width which allows the inner race to be inserted into a cage. There is no requirement for the cage windows to be enlarged or the inner race lobes to be modified in any other way to accept the inner race during assembly.

14 Claims, 4 Drawing Sheets

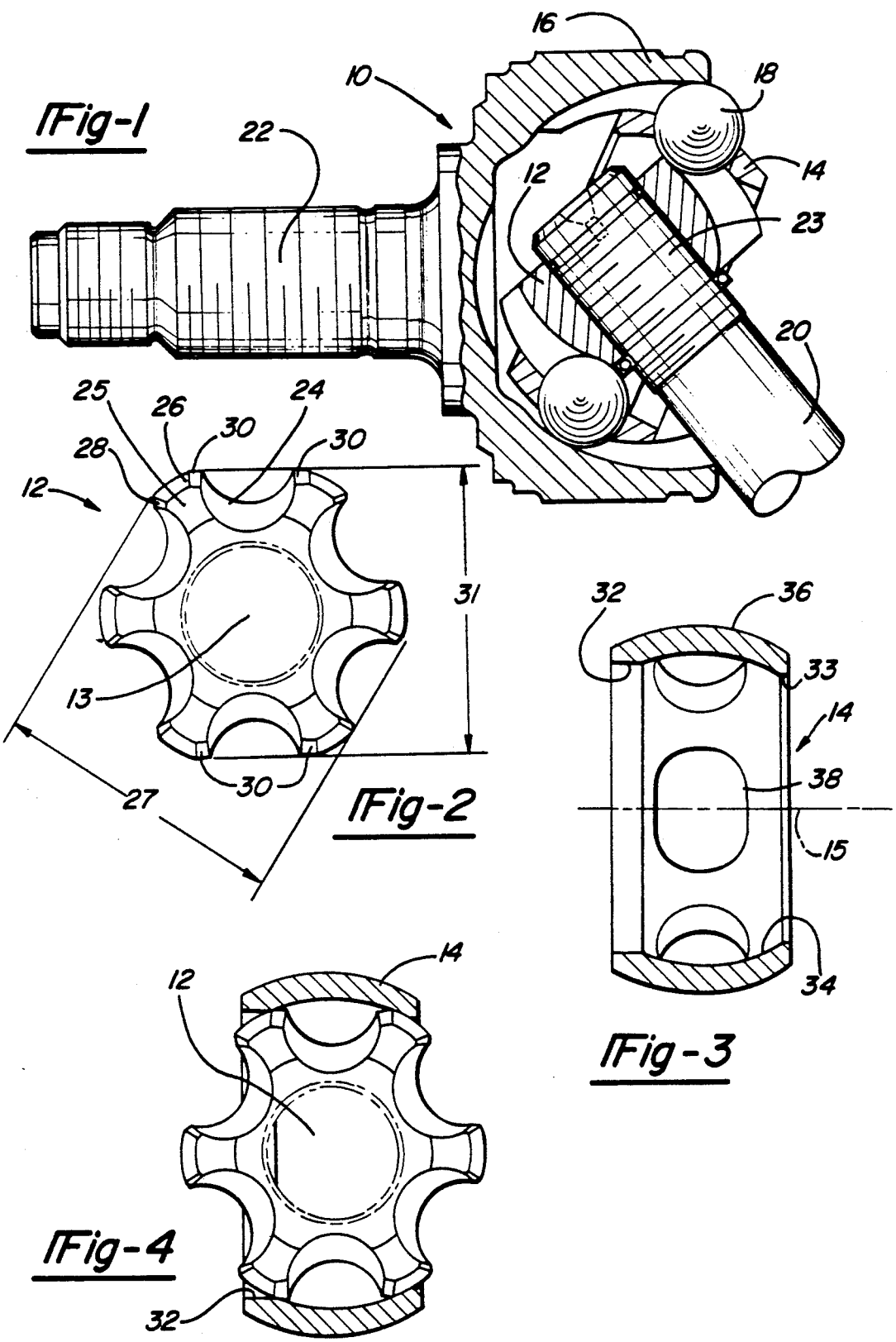

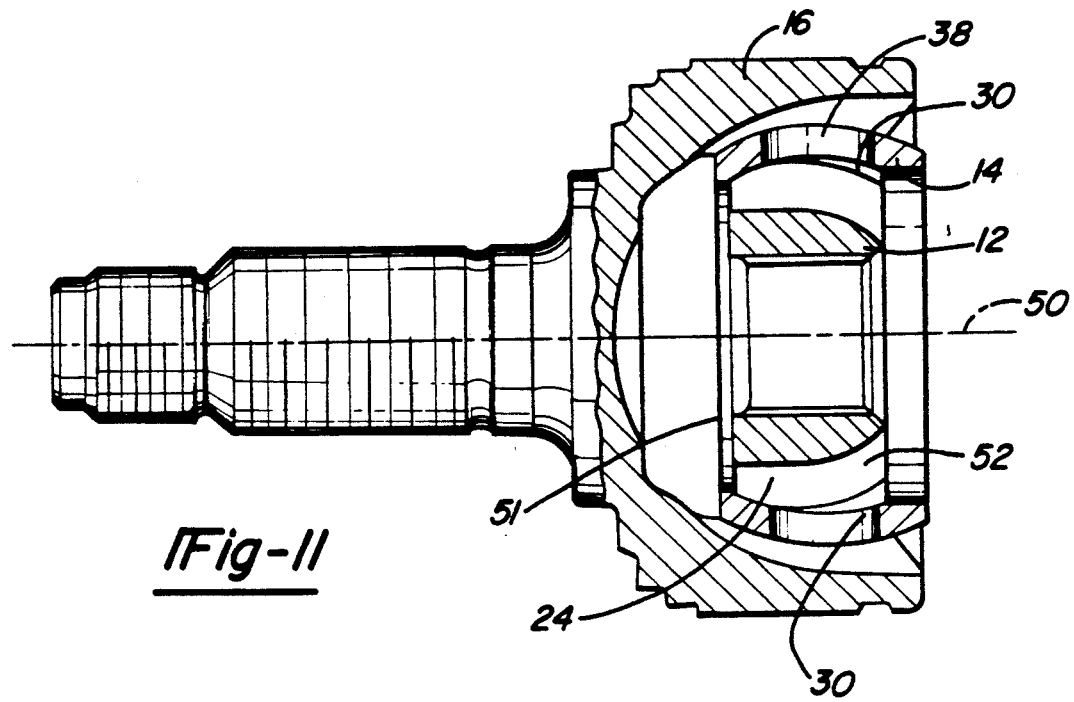
_Fig-11_
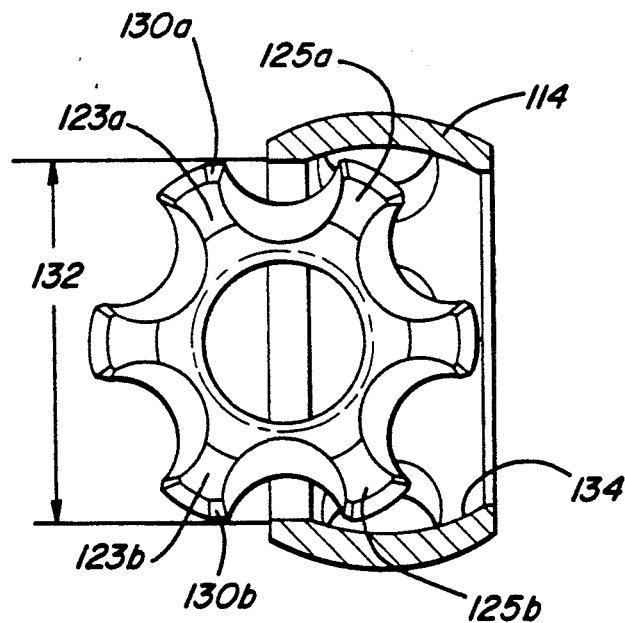
_Fig-8_

CONSTANT VELOCITY UNIVERSAL JOINT AND A METHOD FOR MAKING SAME

BACKGROUND OF THE INVENTION

1. Field of the Invention

The present invention generally relates to constant velocity universal joints. More specifically, this invention relates to constant velocity universal joints and a method for their assembly which more readily facilitates the assembly procedure and which provides a more durable construction.

2. Description of the Prior Art

Constant velocity universal joints are well known in the art and are employed where transmission of a constant velocity rotary motion is desired or required. Constant velocity universal joints typically consist of an inner race, an outer race, a cage which is interposed between the inner and outer races, and a plurality of drive balls which are circumferentially spaced by the cage between the inner and outer race.

The inner race is typically annular in shape and has an exterior surface that is an axially truncated sphere. The exterior surface has a plurality of axially oriented ball tracks which are circumferentially and evenly spaced. Each pair of adjacent ball tracks forms a lobe therebetween whose outer radial surface retains the exterior spherical form of the inner race.

The interior surface of the inner race is generally formed to receive a splined shaft or any other suitable member capable of transmitting rotational motion.

The outer race is also typically annular in shape to receive the inner race. The interior surface of the outer race is spherical in shape and is provided with ball tracks which correspond in number and spacing to the ball tracks of the inner race. Each pair of adjacent ball tracks forms a lobe therebetween whose inner radial surface retains the interior spherical form of the outer race. The exterior surface of the outer race is typically restricted by the envelope that it must reside within.

The cage is also annular in shape and is provided with windows which correspond to the ball tracks of both the inner and outer race. A drive ball is housed within each window and simultaneously engages both an inner and outer race ball track.

In practice the inner and outer race are typically mounted to the adjacent ends of input and output shafts. During operation the cage is dynamically oriented to an attitude in which the plane of the drive balls bisects the angle formed by the intersection of the shafts. The point at which the plane of the drive balls passes through the axis of the cage may be referred to as the theoretical joint center.

To ensure the ease of assembling the inner race with the cage, it is known in the art to circumferentially elongate one or more cage windows to accommodate a lobe of the inner race, as taught in U.S. Pat. No. 1,916,442 to Rzeppa. By this arrangement the axis of the inner race is positioned perpendicular to the axis of the cage and a lobe of the inner race is inserted into the elongated window. This provides sufficient clearance to allow insertion of the diametrally opposing lobe into the cage. The inner race can then be positioned to be centered within the cage and then rotated 90 degress until the inner race and cage are coaxial.

A significant deficiency in this arrangement is the reduced circumferential width of the partitions between the elongated window and adjacent window of the cage. The narrower partitions decrease the strength and life of the cage and, therefore, the assembly. Further, assembly can only be initiated after ascertaining which window or windows are elongated and then inserting an inner race lobe into that window.

Others in the prior art have attempted in various ways to reduce the resultant stress induced on the cage. U.S. Pat. No. 3,324,682 to Bendler taught an inner race having an axially narrowed lobe. The narrowed lobe allowed the length of the elongated window to be reduced in comparison to the prior art. Bendler taught that it was highly detrimental to narrow all of the lobes of the inner race since it would greatly reduce the contact area between the inner and outer race. However, this restriction complicated manufacturing and assembly by making it necessary to manufacture only one or two narrowed lobes, and then establish which lobe was narrowed before initiating assembly. Further, it is apparent that Bendler still resulted in a weakening of the cage, although less than the prior art.

U.S. Pat. No. 3,412,480 to Cull approached the problem by increasing the cage section adjacent to the elongated windows. Cull retained the elongated windows but increased the axial width of the elongated window's outer axial frame. The outer axial frame is that part of the cage which encloses the windows at the axial end adjacent the shaft engaging the inner race. The stress induced by the drive balls being urged toward the outer axial frame was thereby reduced. Again, this configuration would also require ascertaining which window was elongated before assembly could begin.

An alternative method to facilitate assembly taught by U.S. Pat. No. 4,156,353 to Welschof involved reducing the diameter of the inner race towards one axial end. The diameter reduction produced a tapered effect to the lobes of the inner race, overcoming the requirement to elongate the cage windows. However, this method reduces the bearing surface between the inner and outer race. This is an undesirable result as taught by Bendler.

Lastly, U.S. Pat. No. 4,275,531 to Welschof did not teach the assembly of the inner race with the cage, but addressed the assembly of the cage with the outer race. Welschof taught decreasing the outer diameter of the axial end of the cage towards the outer race shaft. Thus, the smaller diameter end of the cage could be inserted first into the outer race to facilitate assembly, yet the wall section upon which the drive balls bear, the axial end towards the inner race shaft, would still be at full section for strength. However, this method did not effect and, consequently, improve assembly of the inner race with the cage.

As can be appreciated from the above, there is a distinct need for a constant velocity universal joint and a method for assembling a constant velocity universal joint which simultaneously provide a durable cage while readily facilitating the assembly procedure.

Accordingly, what is needed is a constant velocity universal joint and an improved method for assembling a constant velocity universal joint which facilitates the assembly of the inner race with the cage but does not require reducing the circumferential width of the partitions between adjacent windows of the cage or significantly reducing the inner race lobe bearing surface.

SUMMARY OF THE INVENTION

It is an object of the present invention to provide a constant velocity universal joint and a method for assembling a constant velocity universal joint which does not require reducing the width of the partitions between adjacent windows of the cage.

It is another object of the invention to make a constant velocity universal joint having a smaller joint envelope and higher torque capabilities.

It is a further object of this invention that such apparatus and method utilize an inner race member whose design facilitates assembly of the inner race with the cage without detrimentally affecting the durability of the inner race.

In accordance with the preferred embodiment of this invention, these and other objects and advantages are accomplished as follows.

According to the present invention there is provided a constant velocity universal joint and a method for assembling the inner race and cage of a constant velocity universal joint. The constant velocity universal joint includes an inner race member, a cage member, an outer race member, and drive balls.

The inner race member is substantially annular in shape. The inner race member preferably has an even number of ball tracks which are axially disposed on its exterior surface. Each pair of adjacent ball tracks forms a lobe therebetween. Two axial edges are formed adjacent each ball track where the ball track meets the exterior surface of the two adjacent lobes. These axial edges may be finished, such as provided with a radius or an edge chamfer, to reduce chipping and burns.

An inner race with an even number of ball tracks has a first diametral width as measured across symmetrically opposed pairs of axial edges provided by diametrally opposed ball tracks. Such an inner race has a second diametral width formed when at least one pair of symmetrically opposed axial edges is provided with a clearance chamfer. As a result, the second diametral width is smaller than the first diametral width.

Satisfactory results can also be achieved with assemblies having odd numbered ball tracks. Such an inner race has a first diameter as measured from the exterior surface of a lobe to the pair of axial edges of the lobe's diametrally opposed ball track. Such an inner race has a second diameter formed when one of the pair of axial edges is provided with a clearance chamfer. Again, the second diameter is smaller than the first diameter.

The cage is also substantially annular in shape. A number of windows equal to the number of inner race ball tracks is provided for receiving the drive balls. The windows are disposed through the annular wall of the cage and are evenly spaced along the cage circumference. The cage has a circular opening that is smaller than the inner race's first diametral width. However, the circular opening is equal to or larger than the inner race's second diametral width. Therefore, it is not possible to insert the inner race into the cage when the inner race is superimposed upon the cage coaxially. However, by positioning the inner race to be adjacent to the cage with the axis of the inner race perpendicular to the axis of the cage, the inner race can be inserted through the circular opening of the cage when the second and smaller of the inner race diametral widths is inserted through the circular opening.

If there are an even number of windows and ball tracks and both symmetrically opposed pairs of axial edges have clearance chamfered surfaces, the inner race can be readily inserted into the cage until an approximately equal portion of the inner race extends from opposite sides of the cage. By rotating the inner race approximately 90 degrees about an axis normal to a plane formed by the axis of the race and the axis of the cage until the inner race is coaxial with the central axis of the cage assembly. This locks the inner race in the cage and forms a cage and inner race.

If there are an even number of windows and ball tracks and only one symmetrically opposed pair of axial edges has a clearance chamfered surface, the inner race can be inserted into the cage by inserting into the cage a first lobe which is adjacent to the first axial edge having the clearance chamfered surface and diametrally opposite the second axial edge having a clearance chamfered surface. By abutting the first lobe against the interior spherical surface of the cage, the symmetrically opposed lobe, which is adjacent to the diametrally opposed second axial edge having a clearance chamfered surface, can then be pivoted into the cage as well. The inner race can then be further inserted into the cage until an approximately equal portion of the inner race extends from opposite sides of the cage. Because the second diametral width of the inner race is smaller than the circular opening in the cage, the second diametral width clears the cage as the inner race is rotated 90 degrees about an axis normal to a plane formed by the axis of the inner race and the cage until the inner race resides entirely within the cage and is coaxial with the cage.

Finally, if there are an odd number of windows and ball tracks and only one axial edge has a clearance chamfered surface, the inner race can be inserted into the cage by first inserting into the cage the lobe diametrally opposite the axial edge having the clearance chamfered surface. By abutting that lobe against the interior spherical surface of the cage, the opposing axial edge can then be pivoted into the cage as well. The inner race can then be further inserted into the cage until an approximately equal portion of the inner race extends from opposite sides of the cage. Because the second diametral width of the inner race is smaller than the circular opening in the cage, the second diametral width clears the cage as the inner race is rotated 90 degrees about an axis normal to a plane formed by the axis of the cage and inner race until the inner race resides entirely within the cage and is coaxial with the cage.

The outer race is also substantially annular in shape and has a number of ball tracks disposed on its interior surface that corresponds to the number of windows and inner race ball tracks. Each pair of adjacent ball tracks forms a lobe therebetween. The inner diameter of the outer race is the distance between diametrally opposed lobes.

The inner and outer ball tracks and the cage windows together receive drive balls which transfer torque between the inner race and the outer race.

According to a preferred aspect of this invention, an inventive feature is that the clearance chamfered surfaces on the axial edges of the inner race ball tracks produce a diametral width which is smaller than the diameter of the circular opening of the cage. The reduced diametral width eliminates the need for an elongated window and an axially narrowed lobe. Further, if an even number of windows and ball tracks are provided and clearance chamfered surfaces are provided on both pairs of symmetrically opposed axial edges, it is not necessary to first insert a lobe of the inner race into the cage to assemble the inner race with the cage, further simplifying assembly.

In addition, a significant advantage of the present invention is that the elimination of elongated windows and axially narrowed lobes avoids the resulting weakened and less durable assembly as taught by the prior art.

Other objects and advantages of this invention will be more apparent after a reading of the detailed description thereof taken in conjunction with the drawings appended hereto.

BRIEF DESCRIPTION OF THE DRAWINGS

FIG. 1 is a partial cross sectional view of a constant velocity joint in accordance with a preferred embodiment of this invention;

FIG. 2 is an end view of the inner race of the constant velocity joint of FIG. 1;

FIG. 3 is a partial cross sectional view of the cage of FIG. 1 in accordance with a preferred embodiment of this invention;

FIG. 4 is a partial cross sectional view of the inner race of FIG. 2 inserted into the cage of FIG. 3 in accordance with a preferred embodiment of this invention;

FIG. 8 is a partial cross sectional view of the inner race of FIG. 7 inserted into the cage of FIG. 3 in accordance with an alternative embodiment of this invention;

FIG. 11 is a partial cross sectional view of the cage and inner race assembly of FIG. 6 inserted into an outer race in accordance with a preferred embodiment of this invention.

DETAILED DESCRIPTION OF THE PREFERRED EMBODIMENT

Figure 5:
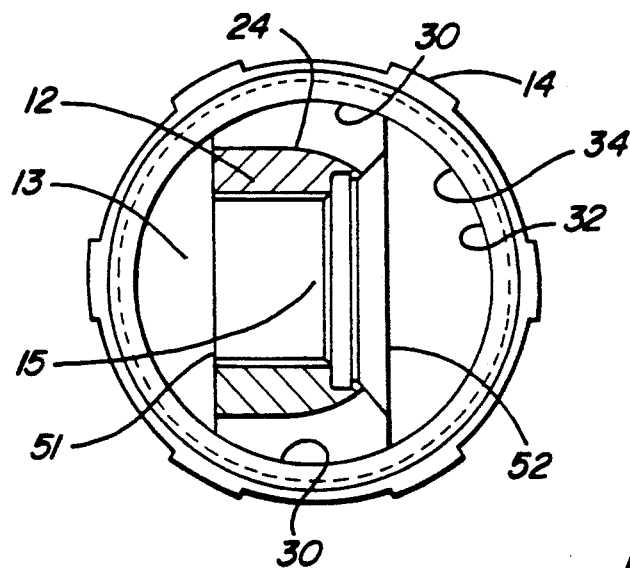
FIG. 5 is a side view of the inner race and cage illustrated in FIG. 4.

In a preferred embodiment of this invention, a constant velocity universal joint 10 as shown in FIG. 1 is provided which includes an inner race 12, a cage 14, an outer race 16, and a predetermined number of drive balls 18. The inner race 12 and outer race 16 are each attached to a shaft, 20 and 22, respectively, which provide the rotational motion to be transmitted. The attitude of the cage 14 during operation is also shown wherein the plane of the housed drive balls 18 bisects the angle formed by the intersection of the shafts 20 and 22 through the theoretical joint center 23.

As illustrated in FIG. 2, the inner race 12 has a substantially annular shape and an axis of rotation 13. An exterior surface 26 of the inner race 12 is an axially truncated sphere. The inner race 12 has a predetermined number of ball tracks 24 which are disposed in the exterior surface 26 parallel to the axis of rotation 13. Each pair of adjacent ball tracks 24 forms a lobe 25 therebetween whose outer radial surface defines the exterior surface 26 of the inner race 12. Also, axial edges 28 are formed where the ball tracks 24 and the exterior surface 26 meet.

For purposes of FIG. 2, the inner race 12 has an even number of ball tracks 24. The inner race 12 has a first exterior diametral width 27 as measured across pairs of diametrally opposed axial edges 28. A pair of the diametrally opposed ball tracks 24 have both pairs of axial edges 28 chamfered to provide symmetrically opposed clearance chamfered surfaces 30. The clearance chamfered surfaces 30 produce a second exterior diametral width 31 which is smaller than the first exterior diametral width 27.

As shown in FIG. 3, the cage 14 is substantially annular in shape and has an axis of rotation 15. An interior surface 34 and exterior surface 36 of the cage are axially truncated spherical surfaces. The diameter of the interior surface 34 is equal to or slightly larger than the diameter of the exterior surface 26 of the inner race 12. The cage 14 has a number of windows 38 disposed through its annular wall which correspond in number to the ball tracks 24 on the inner race 12. A first circular opening 32 in the cage is smaller than the first exterior diametral width 27 of the inner race 12, but is equal to or larger than the second exterior diametral width 31 of the inner race 12. A second circular opening 33 is smaller than the second exterior diametral width 31 of the inner race 12.

FIG. 4 demonstrates how the inner race 12 is oriented so that its axis of rotation 13 is perpendicular to the axis of rotation 15 of the cage 14 in order for the second exterior diametral width 31 to pass through the first circular opening 32 of the cage 14. The inner race 12 is inserted into the cage until an approximately equal portion of the inner race 12 extends from opposite sides of the cage 14.

FIG. 5 is a side view of the assembly illustrated in FIG. 4. This view depicts the diametral fit between the clearance chamfered surfaces 30 and the first circular opening 32 of the cage 14 that is achieved which permits the insertion of the inner race 12 into the cage 14.

Figure 6:
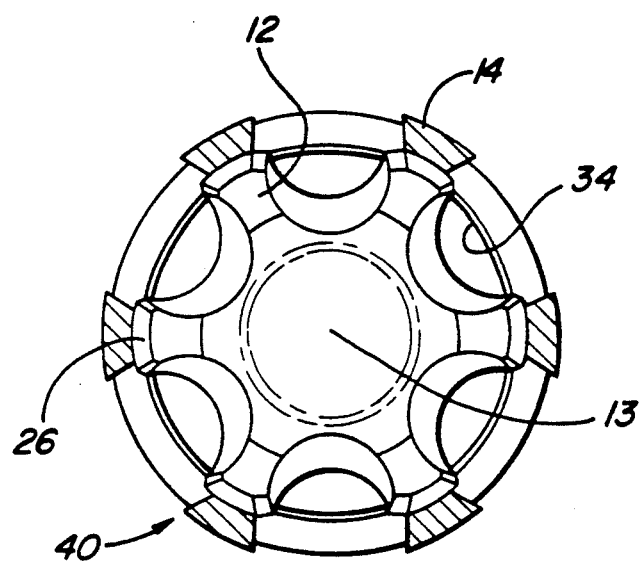
FIG. 6 is a partial cross sectional view of the inner race and cage of FIG. 5.

As shown in FIG. 6, the inner race 12 is then rotated approximately 90 degrees about an axis normal to a plane formed by the axes of rotation 13 and 15 until its axis of rotation 13 becomes coaxial with the axis of rotation 15 of cage 14, thus forming a cage and inner race assembly 40. The spherically-shaped exterior surface 26 of the inner race 12 is now adjacent to the interior surface 34 of the cage 14.

Figure 7:
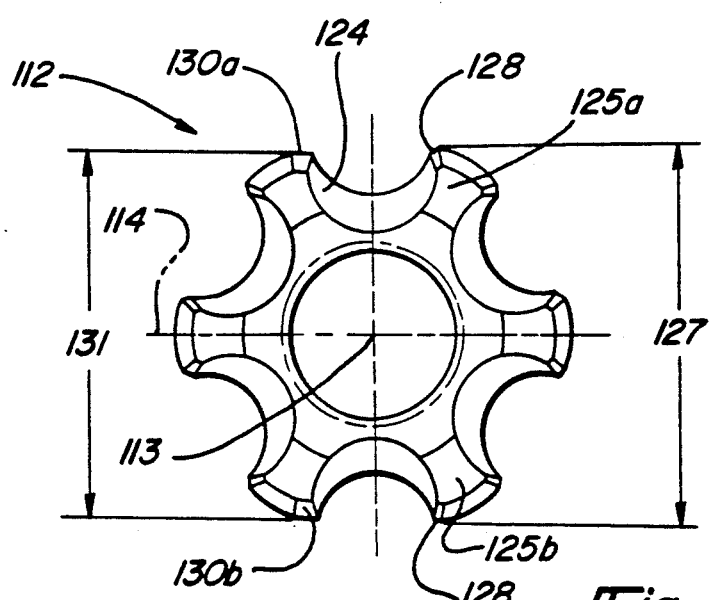
FIG. 7 is an end view of an inner race in accordance with an alternative embodiment of this invention.

FIG. 7 shows a first alternate embodiment of an inner race 112 in which only one pair of axial edges symmetrically opposed relative to a plane 114 passing through an axis of rotation 113 are chamfered to provide clearance chamfered surfaces 130a and 130b. A first exterior diametral width 127 is measured across the symmetrically opposed axial edges 128, and a second exterior diametral width 131 is measured across the symmetrically opposed clearance chamfered surfaces 130a and 130b.

As shown in FIG. 8, a first lobe 125a, which is adjacent to a lobe 123a having clearance chamfered surface 130a and a diametrically opposite lobe 123b having clearance chamfered surface 130b, must first be inserted into a cage 114 and moved against the internal spherical surface 134 in order to permit the symmetrically opposing lobe 125b to be inserted into the cage 114. From this step, the remainder of the assembly method is the same as that illustrated in FIGS. 4 through 6.

It is apparent that the need to provide clearance chamfered surfaces on both pairs of symmetrically opposed axial edges 28, as shown in FIG. 2, is not only for ease of manufacture of the inner race 12 but also produces an inner race 12 which is symmetrically balanced about its axis of rotation 13 and, therefore, will not vibrate at high rotational speeds. However, it is not necessary for assembly purposes, as shown by the embodiment in FIG. 7. The benefit of having only one pair of symmetrically opposed chamfered surface 130a and 130b is an improvement in strength of the inner race over its life. It is also important to note that the degree of chamfering of the axial edges 128 to produce clearance chamfered surfaces 130a and 130b is required only to the extent to permit the inner race 12 to be received through the diametral opening 132 of the cage 114.

Figure 9:
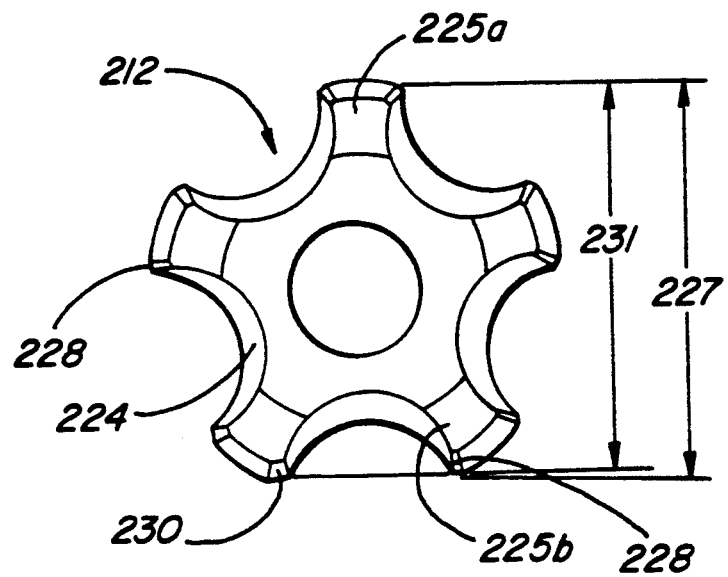
FIG. 9 is an end view of an inner race in accordance with an alternative embodiment of this invention.
Figure 10:
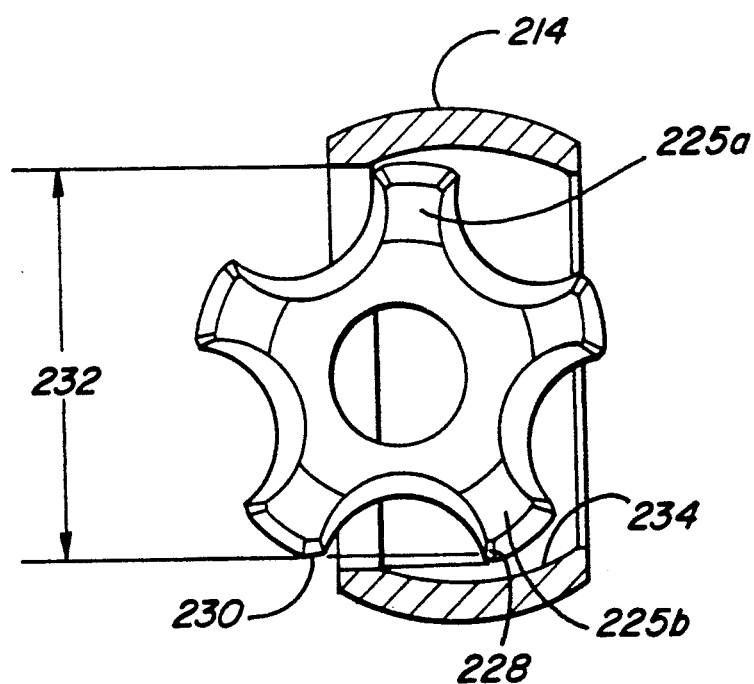
FIG. 10 is a partial cross sectional view of the inner race of FIG. 9 inserted into the cage of FIG. 3 in accordance with an alternative embodiment of this invention.

FIGS. 9 and 10 illustrates a second alternate embodiment of an inner race 212 having an odd number of ball tracks 224. This embodiment requires only one axial edge 228 to be chamfered to produce a clearance chamfered surface 230. A first exterior diametral width 227 is measured across a first lobe 225a and diametrally opposed axial edges 228, and a second exterior diametral width 231 is measured across the first lobe 225a and the opposed chamfered surface 230.

As shown in FIG. 10, the first lobe 225a, which is opposed to the chamfered surface 230, must first be inserted into a cage 214 and moved against an inner spherical surface 234 to permit the opposing lobe 225b, not provided with a chamfered surface 230, to be inserted into the cage 214. From this step, the method is the same as that illustrated in FIGS. 4 through 6.

With all three embodiments illustrated in FIGS. 2, 7 and 9, durability can be enhanced by tapering the clearance chamfered surfaces 30, 130 and 230, respectively. As seen in FIG. 11, the inner ball tracks 24 are typically provided with a taper toward the center axis 50 of the inner race 12 from a posterior end 51 to an anterior end 52 of the inner race 12. By decreasing the degree of chamfer of the clearance chamfered surface toward the posterior end 51 until the chamfer is substantially eliminated at the posterior end 51, a more uniform depth of the inner ball tracks 24 is attained.

The cage and inner race assembly 40, as shown in FIG. 6, can be assembled into the outer race 16 in any conventional manner. The resulting assembly is illustrated in FIG. 11. The drive balls 18 are then correspondingly inserted into the composite ball tracks to complete the assembly of the constant velocity universal joint 10.

In the preferred embodiment, a significant advantage of providing clearance chamfered surfaces 30 on the inner race 12 is the ability to readily assemble the inner race 12 with the cage 14 while maintaining a minimal diametral clearance. It is not required to initiate assembly by inserting a lobe 25 into a window 38 as in past practice, consequently eliminating the need to modify the cage windows 28 which would otherwise result in reducing the durability of the cage 14. There is also no requirement to provide asymmetric machining steps during the manufacture of the cage 14.

While the invention has been described in terms of a preferred embodiment, it is apparent that other forms could be adopted by one skilled in the art. An example is providing clearance radii instead of clearance chamfered surfaces 30 on the inner race 12. Accordingly, the scope of the invention is to be limited only by the following claims.

What is claimed is:

1. A method for assembling a cage and inner race assembly, said method comprising the steps of:
   providing an inner race, said inner race being substantially annular in shape, said inner race having a race axis of rotation, said inner race having an exterior surface, said exterior surface having an even number of inner ball tracks disposed parallel to said race axis of rotation, said exterior surface and each of said even number of inner ball tracks forming axial edges therebetween, said inner race having a first exterior diametral width as measured across symmetrically opposed first pairs of said axial edges, said inner race having a second exterior diametral width as measured across symmetrically opposed second pairs of said axial edges, said second pairs of said axial edges having a first pair of opposed clearance chamfered surfaces and a second pair of opposed clearance chamfered surfaces; said second exterior diametral width being smaller than said first exterior diametral width;
   providing a cage, said cage having a cage axis of rotation, said cage being substantially annular in shape concentric with said cage axis of rotation, said cage having an interior cage surface, an exterior cage surface, and an even number of windows radially extending therethrough, said even number of windows corresponding in number to said even number of inner ball tracks, said even number of windows being substantially equal in size, said cage having a full circular opening smaller than said first exterior diametral width of said inner race, said full circular opening being equal to or larger than said second exterior diametral width of said inner race;
   orienting said inner race adjacent to said cage with said race axis of rotation substantially perpendicular to said cage axis of rotation, said inner race being oriented such that said at least one diametrally opposed pair of said even number of inner ball tracks extends normal to said cage axis of rotation, said second exterior diametral width being aligned adjacent said full circular opening of said cage;
   inserting said inner race into said cage through said full circular opening until an approximately equal portion of said inner race extends from opposite sides of said cage; and
   rotating said inner race approximately 90 degrees about an axis normal to a plane formed by said race and cage axes of rotation until said race axis of rotation is coaxial with said cage axis of rotation, said cage and said inner race forming a cage and inner race assembly.

2. A method as claimed in claim 1, further comprising the steps of:
   providing said inner race with an anterior end and a posterior end;
   forming said even number of inner ball tracks to be radially tapered toward said race axis of rotation from said posterior end to said anterior end; and
   forming said first and second pairs of opposed chamfered surfaces to be tapered such that the chamfer decreases toward said posterior end and is substantially eliminated at said posterior end.

3. A method is claimed in claim 1, further comprising the step of chamfering all of said axial edges of said inner race.

4. A method as claimed in claim 1, further comprising the steps of:
   forming said exterior surface of said inner race to be substantially an axially truncated sphere; and
   forming said interior cage surface and said exterior cage surface to be substantially axially truncated spheres.

5. A constant velocity universal joint comprising:

an inner race having an axis of rotation, said inner race being substantially annular in shape, said inner race having an exterior surface, said exterior surface having an even number of inner ball tracks axially oriented and disposed thereon, each adjacent pair of said even number of inner ball tracks forming a lobe therebetween, each of said even number of inner ball tracks and each adjacent lobe forming an axial edge therebetween, said inner race having a first exterior diametral width as measured across symmetrically opposed axial edges, one diametrally opposed pair of said even number of inner ball tracks having at least one symmetrically opposed pair of axial edges having clearance chamfered surfaces thereon, said clearance chamfered surfaces forming a second exterior diametral width smaller than said first exterior diametral width;

a cage superposed said inner race, said cage being substantially annular in shape, said cage having an even number of windows extending therethrough, said even number of windows corresponding in number to said even number of inner ball tracks, said even number of windows being substantially equal in size, said cage having a full circular opening being smaller than said first exterior diametral width, said full circular opening being equal to or larger than said second exterior diametral width;

an outer race superposed said cage, said outer race being substantially annular in shape, said outer race having an interior surface, said interior surface having an even number of outer ball tracks axially oriented and disposed thereon, said even number of outer ball tracks corresponding in number to said even number of inner ball tracks; and an even number of drive balls simultaneously engaging said even number of windows, said inner ball tracks and said outer ball tracks.

6. A constant velocity universal joint as claimed in claim 5, wherein said inner race has an anterior end and a posterior end, said even number of inner ball tracks are radially tapered toward said axis of rotation from said posterior end to said anterior end, and said chamfered surfaces are tapered such that the chamfer decreases toward said posterior end and is substantially eliminated at said posterior end.

7. A constant velocity universal joint as claimed in claim 5, wherein each of said axial edges have chamfered surfaces thereon.

8. A constant velocity universal joint as claimed in claim 5, wherein said exterior surface of said inner race is an axially truncated sphere and said cage has interior and exterior cage surfaces which are axially truncated spheres.

9. A constant velocity universal joint as claimed in claim 5, wherein said inner race has a first shaft attached thereto and said outer race has a second shaft attached thereto.

10. A constant velocity universal joint comprising:

an inner race, said inner race having a substantially annular shape and a central axis of rotation, said inner race having an exterior surface, said exterior surface having an odd number of inner ball tracks disposed thereon substantially parallel to said central axis of rotation, each adjacent pair of said odd number of inner ball tracks forming a lobe therebetween, each of said odd number of inner ball tracks and said lobe forming an axially oriented edge therebetween, said inner race having a first exterior diametral width as measured across a first lobe and a diametrally opposed axially oriented edge, one of said axially oriented edges having a clearance chamfered surface thereon, said inner race having a second exterior diametral width as measured across said chamfered surface and a second diametrally opposed lobe, said second exterior diametral width being smaller than said first exterior diametral width;

a cage superposed said inner race, said cage being substantially annular in shape, said cage having an odd number of windows extending therethrough, said odd number of windows corresponding in number to said odd number of inner ball tracks, said odd number of windows being substantially equal in size, said cage having a full circular opening being smaller than said first exterior diametral width, said full circular opening being equal to or larger than said second exterior diametral width;

an outer race superposed said cage, said outer race being substantially annular in shape, said outer race having an interior surface, said interior surface having an odd number of outer ball tracks axially oriented and disposed thereon, said odd number of outer ball tracks corresponding in number to said odd number of inner ball tracks; and an odd number of drive balls simultaneously engaging said odd number of windows, said inner ball tracks and said outer ball tracks.

11. A constant velocity universal joint as claimed in claim 10, wherein said inner race has an anterior end and a posterior end, said odd number of inner ball tracks are radially tapered toward said center axis of rotation from said posterior end to said anterior end, and said clearance chamfered surface is tapered such that the chamfer decreases toward said posterior end and is substantially eliminated at said posterior end.

12. A constant velocity universal joint as claimed in claim 10, wherein each of said axial edges have chamfered surfaces thereon.

13. A constant velocity universal joint as claimed in claim 10, wherein said exterior surface of said inner race is an axially truncated sphere and said cage has interior and exterior cage surfaces which are axially truncated spheres.

14. A constant velocity universal joint as claimed in claim 10, wherein said inner race has a first shaft attached thereto and said outer race has a second shaft attached thereto.

* * * * *